No. 821,047. PATENTED MAY 22, 1906.
F. C. LYON.
ADJUSTABLE HEADLIGHT.
APPLICATION FILED NOV. 29, 1905.
2 SHEETS—SHEET 1.
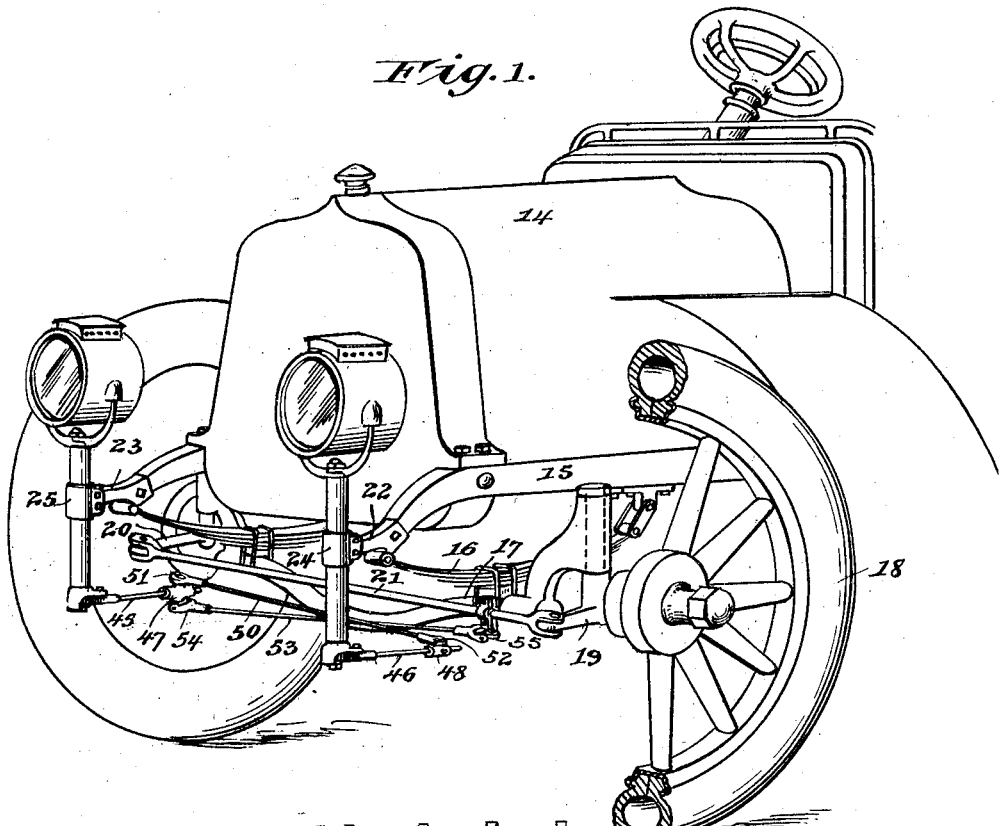
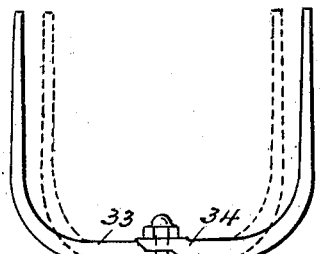
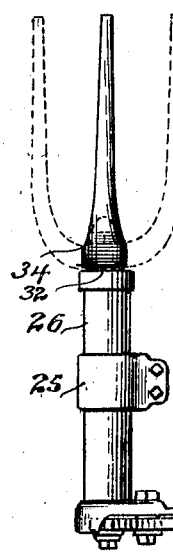
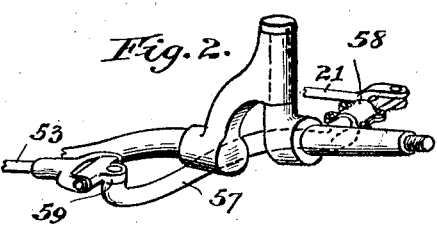
Witnesses,
S. S. Mann
James R. Offield
Inventor,
Fred C. Lyon.
By Offield Towle and Linthicum
Att'ys.

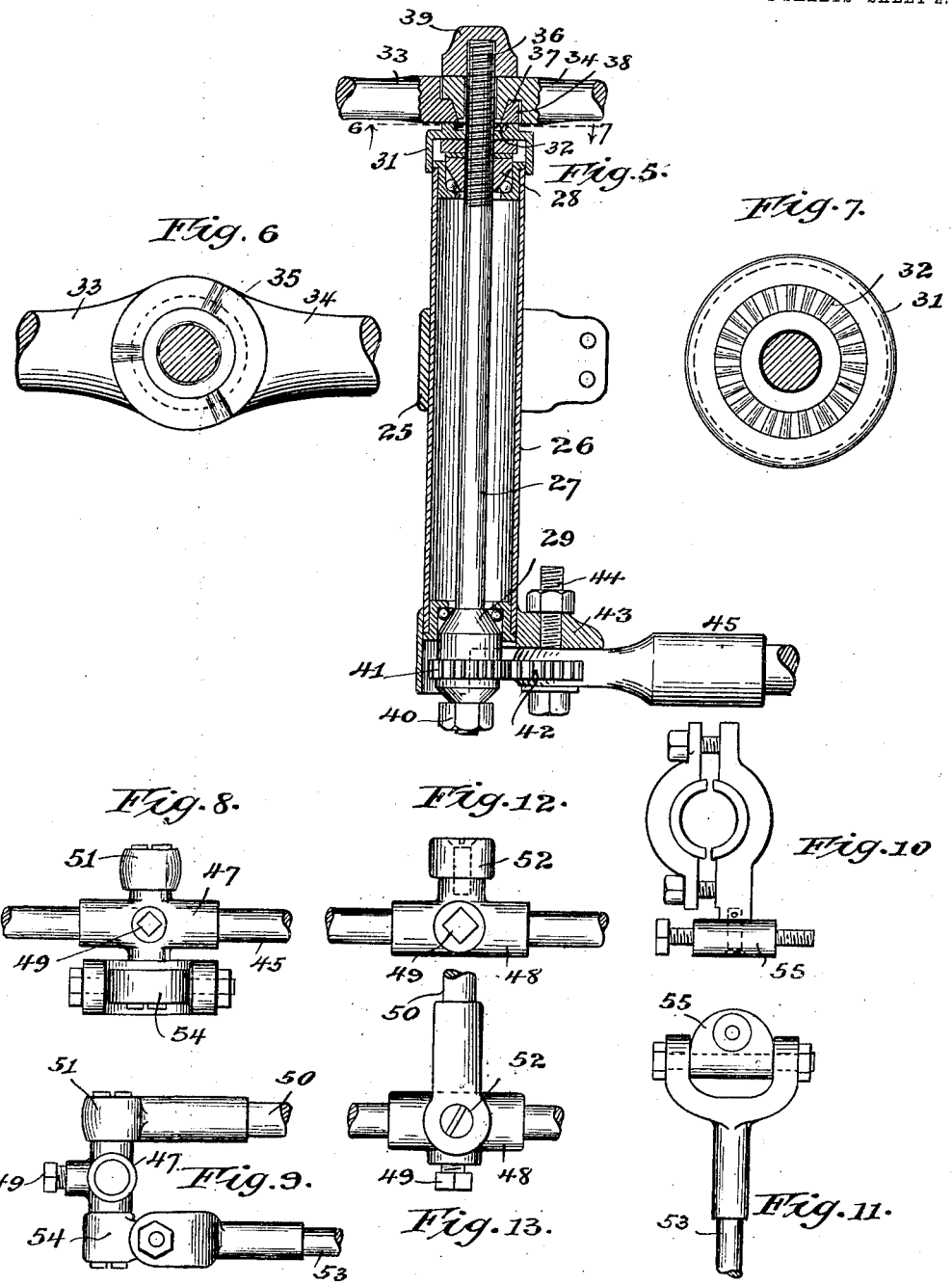

UNITED STATES PATENT OFFICE.

FRED C. LYON, OF EVANSTON, ILLINOIS.

ADJUSTABLE HEADLIGHT.

No. 821,047.  Specification of Letters Patent.  Patented May 22, 1906.

Application filed November 29, 1905. Serial No. 289,647.

*To all whom it may concern:*

Be it known that I, FRED C. LYON, a citizen of the United States, residing at Evanston, in the county of Cook and State of Illinois, have invented certain new and useful Improvements in Adjustable Headlights, of which the following is a specification.

My invention relates to adjustable headlights for vehicles, and more particularly to adjustable headlights for automobiles; and it consists in the novel arrangements and construction of parts so that the same may be applied to any automobile irrespective of the fact that the steering-knuckles are in front or behind the front axle, and it may be attached without the drilling or boring of holes, all parts being so constructed that they can be readily attached and detached.

It further consists in means for adjusting each light separately, so that either may travel at a slower or faster speed than the other, thereby deflecting lights at different angles from the longitudinal axial line of the car, or the same may be adjusted to travel at the same speed or on the same angle.

It further consists in adjustable forks for retaining the lamps, whereby lamps of various diameters may be used by a mere adjustment of the forks.

I am aware that there are numerous headlights so arranged that the light will follow the road or track and not the longitudinal line of the car frame or body; but I believe myself to be the first to construct one so adjustable that it may be applied to any automobile provided with knuckles either forward or rear of the front axle. I believe myself to be the first to so arrange the parts that the lights may travel at different angles and also in providing adjustable forks to fit lamps of various diameters.

In the drawings, Figure 1 is a front elevation of an automobile with my device attached, the steering-knuckles being forward of the front axle. Fig. 2 is a side elevation of the forward left axle, hub, and knuckle and designed to show the arm used when the steering-knuckle is in the rear of the front axle. Fig. 3 is a side elevation of one of the lamp-brackets and designed to show the forks in extended and partially-contracted positions. Fig. 4 is a side elevation of one of the brackets, showing the gearing and forks turned at right angles. Fig. 5 is a vertical section of one of the lamp-brackets and adjustable forks. Fig. 6 is a cross-section on the line 6 7 of Fig. 5 looking in the direction of the arrow at 6. Fig. 7 is a cross-section on the line 6 7 of Fig. 5 looking in the direction of the arrow at 7. Figs. 8 and 9 are elevational views at right angles to each other of one of the universal joints. Figs. 10 and 11 are similar views of the universal joint, and Figs. 12 and 13 are similar views of a third joint.

Referring to the drawings in detail, 14 represents a car-body as a whole set upon the frame 15, carrying the usual springs 16, axle 17, wheels 18, steering-knuckles 19 and 20, and connecting-rod 21. Attached to any suitable portion of the car by means of the brackets 22 and 23 are the lamp-brackets 24 and 25, each consisting of an outer casing 26, a rod 27 within said casing capable of revolving therein and being provided with cone-bearings 28 and 29. Covering the upper bearing is a cap 31, the top of which is provided with a ratchet-face 32, upon which rests one of the forks 33 and 34, the lower one provided with a ratchet-face 35, adapted to register with the ratchet-face 32. Said forks are provided with an aperture adapted to register with each other and with the threaded portion 36 of the rod 27, one of said forks having a countersunk portion 37 and other of said forks an annular boss 38, adapted to register with the countersunk portion, whereby each fork may be moved separately, and a nut 39 secures the forks in proper relative position.

Secured to the lower portion of rod 27 by means of a nut 40 is a gear-wheel 41 of any desired size intermeshing with a segmental gear 42, secured to the bracket by means of the offset portion 43 and bolt 44, each being apertured to receive said bolt. Attached to the segmental gears 42 are levers 45 and 46, the outer ends of which pass through collars 47 and 48 and are secured therein by means of the set-screws 49. These collars are connected by a rod 50, which has a pivotal connection at 51 in a horizontal plane with the collar 47 and a similar connection at 52 with collar 48. A connecting-rod 53 has a universal-joint connection 54, Figs. 8 and 9, at one end with the lower side of collar 47 and a similar connection 55, Figs. 10 and 11, with the knuckle-connecting rod 21 of the main steering-gear. It can thus readily be seen that a movement of the connecting-rod 21 will move the rod 53, which in turn will move the rod 50, thereby giving a lateral movement to the levers connected to the segmental gears, which intermeshing with the gear-wheels 42 will give a movement to the lamps corresponding to the angle at which the wheels are turned. When it is desired to have one lamp turn at a greater angle than the other, it is accomplished by sliding either of the collars forward of the other on their respective rods, the angle of the lamp being increased or diminished according to the position of the collar. When the steering-knuckles are back of the forward axle, an arm 57, Fig. 2, is provided, being adapted to pass under the axle and connected at one end to the steering-knuckle by any suitable means, as shown at 58, and to the connecting-rod 53, preferably as shown at 59.

From the above description it can be seen that my device can be readily applied to any automobile irrespective of the position of the steering-knuckles and attached without injury to the car.

It can be further seen that various modifications and changes might be made in my construction, such as variations in the size of the gears, methods of securing the connecting-rods to each other, the attaching of the lamps to various portions of the car, and the securing of the lamps in proper relative position.

Therefore, without limiting myself to the precise details of construction set forth in my specification, I claim—

1. In combination with the steering apparatus of a vehicle and a plurality of rotatable lamps, of adjustable connections between said steering apparatus and said lamps whereby turning movements of unequal extents may be imparted to said lamps respectively upon a movement of said steering apparatus, substantially as described.

2. The combination with the steering apparatus of a vehicle, and a plurality of rotatably-supported lamp-actuating rods, of adjustable connections between said steering apparatus and said lamp-actuating rods whereby turning movements of equal or different extents may be imparted to the lamps upon a movement of said steering apparatus, substantially as described.

3. The combination with the steering apparatus of a vehicle, and a rotatably-supported lamp-actuating rod, of a gear-wheel on said rod, a lever having a segmental gear engaging said gear-wheel, and a connecting-rod connected to said lever and steering apparatus by universal-joint couplings, substantially as described.

4. The combination with the steering apparatus of a vehicle, and a rotatably-supported lamp-actuating rod, of a gear-wheel on said rod, a lever having a segmental gear engaging said gear-wheel, a collar on said lever adjustable lengthwise thereof, and a connecting-rod connected to said collar and steering apparatus by universal-joint couplings, substantially as described.

5. The combination with the steering apparatus of a vehicle, and a pair of rotatably-supported lamp-actuating rods, of gear-wheels on said rods, levers having segmental gears engaging said gear-wheels, a connecting-rod between one of said levers and said steering apparatus, and another connecting-rod between said levers, substantially as described.

6. The combination with the steering apparatus of a vehicle, and a pair of rotatably-supported lamp-actuating rods, of gear-wheels on said rods, levers having segmental gears engaging said gear-wheels, collars on said levers adjustable lengthwise thereof, a connecting-rod pivotally connected to one of said collars and said steering apparatus, and another connecting-rod pivotally connected to said collars, substantially as described.

7. The combination with the steering apparatus of a vehicle, and a pair of rotatably-supported lamp-actuating rods, of gear-wheels on said rods, levers having segmental gears engaging said gear-wheels, collars on said levers adjustable lengthwise thereof, a connecting-rod connected to one of said collars and said steering apparatus by universal-joint couplings, and another connecting-rod pivotally connected to said collars, substantially as described.

FRED C. LYON.

Witnesses:
WALTER M. FULLER,
FREDERICK C. GOODWIN.